(12) United States Patent
Ikenoue et al.

(10) Patent No.: US 12,511,710 B2
(45) Date of Patent: Dec. 30, 2025

(54) IMAGE DISPLAY SYSTEM AND IMAGE DISPLAY METHOD

(71) Applicant: Sony Interactive Entertainment Inc., Tokyo (JP)

(72) Inventors: Shoichi Ikenoue, Chiba (JP); Kenichiro Yokota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 272 days.

(21) Appl. No.: 18/261,188

(22) PCT Filed: Dec. 21, 2021

(86) PCT No.: PCT/JP2021/047240
§ 371 (c)(1),
(2) Date: Jul. 12, 2023

(87) PCT Pub. No.: WO2022/158220
PCT Pub. Date: Jul. 28, 2022

(65) Prior Publication Data
US 2024/0119557 A1    Apr. 11, 2024

(30) Foreign Application Priority Data

Jan. 25, 2021   (JP) .................................. 2021-009863

(51) Int. Cl.
*G06T 3/4023*    (2024.01)
*G06F 3/01*    (2006.01)
(Continued)

(52) U.S. Cl.
CPC .............. *G06T 3/4023* (2013.01); *G06T 9/00* (2013.01); *G09G 3/001* (2013.01); *G06F 3/012* (2013.01);
(Continued)

(58) Field of Classification Search
None
See application file for complete search history.

(56) References Cited

U.S. PATENT DOCUMENTS 8,248,437 B2    8/2012   Yamaguchi
10,156,724 B2   12/2018  Shimazu
(Continued)

FOREIGN PATENT DOCUMENTS

JP    01141479 A    6/1989
JP    07135651 A    5/1995
(Continued)

OTHER PUBLICATIONS

International Search Report for related PCT Application No. PCT/JP2021/047241, 6 pages, dated Mar. 15, 2022.
(Continued)

*Primary Examiner* — Yingchun He
(74) *Attorney, Agent, or Firm* — Kilpatrick Townsend & Stockton LLP

(57) ABSTRACT

A condition information acquisition section of an image generation device acquires a condition of communication and condition information of a head-mounted display. An image generation section generates a display image including distorted images for a left eye and a right eye. A reduction processing section converts the display image to data in which different regions have different reduction ratios in accordance with the condition of communication, etc., and transmits the data through an output section. An
(Continued)

image size restoration section of the head-mounted display restores the transmitted data to the display image in an original size to cause the display image to be displayed by a display section.

20 Claims, 11 Drawing Sheets

(51) Int. Cl.
*G06T 9/00* (2006.01)
*G09G 3/00* (2006.01)
*H04N 13/332* (2018.01)

(52) U.S. Cl.
CPC ... *G09G 2340/02* (2013.01); *G09G 2340/045* (2013.01); *G09G 2354/00* (2013.01); *G09G 2370/022* (2013.01); *G09G 2370/16* (2013.01); *H04N 13/332* (2018.05)

(56) References Cited

U.S. PATENT DOCUMENTS

| | | | |
|---|---|---|---|
| 10,334,237 | B2 | 6/2019 | Inada |
| 10,475,370 | B2 | 11/2019 | Spitzer |
| 10,664,953 | B1 | 5/2020 | Lanman |
| 11,323,682 | B2 | 5/2022 | Nakata |
| 2009/0315887 | A1 | 12/2009 | Yamaguchi |
| 2016/0227203 | A1 | 8/2016 | Nada |
| 2017/0236466 | A1 | 8/2017 | Spitzer |
| 2017/0316607 | A1 | 11/2017 | Khalid |
| 2017/0330349 | A1 | 11/2017 | Kolesnikov |
| 2018/0074321 | A1 | 3/2018 | Shimazu |
| 2018/0190236 | A1* | 7/2018 | Philipp .................. G09G 5/005 |
| 2020/0269133 | A1 | 8/2020 | Sun |
| 2021/0266514 | A1 | 8/2021 | Nakata |

FOREIGN PATENT DOCUMENTS

| | | | |
|---|---|---|---|
| JP | 07288806 | A | 10/1995 |
| JP | 099253 | A | 1/1997 |
| JP | H099253 | A * | 1/1997 |
| JP | 2004233869 | A | 8/2004 |
| JP | 2005130251 | A | 5/2005 |
| JP | 2008131321 | A | 6/2008 |
| JP | 2010004176 | A | 1/2010 |
| JP | 2014077993 | A * | 5/2014 |
| JP | 2016140017 | A | 8/2016 |
| JP | 2016212351 | A | 12/2016 |
| JP | 2017215875 | A | 12/2017 |
| JP | 2019507380 | A | 3/2019 |
| WO | 2019092463 | A1 | 5/2019 |
| WO | 2020008511 | A1 | 1/2020 |

OTHER PUBLICATIONS

International Search Report for corresponding PCT Application No. PCT/JP2021/047240, 6 pages, dated Mar. 15, 2022.

* cited by examiner (a)

(b)

IMAGE DISPLAY SYSTEM AND IMAGE DISPLAY METHOD

TECHNICAL FIELD

The present invention relates to an image display system including an image generation device and a display device, and an image display method.

BACKGROUND ART

Image display systems that make it possible to enjoy a target space from a free point of view have become widespread. For example, electronic content is known which realizes VR (virtual reality) by causing images representing a virtual three-dimensional space and matching the direction of a line of sight of a user wearing a head-mounted display to be displayed. Use of the head-mounted display leads to an enhanced sense of immersion into the video, and improved operability of an application, such as a game. In addition, a walk-through system has been developed that enables a user wearing a head-mounted display to virtually walk around in a space displayed in a video form by moving physically.

SUMMARY

Technical Problems

Irrespective of the type of the display device and flexibility of a viewpoint, image display is required to have a high responsivity in a case where the field of view changes or a world being displayed is moving. Meanwhile, to achieve increased reality of image representation, an increase in resolution and complicated computation, for example, are required, resulting in increased costs of image processing and data transfer. This can lead to a failure of the display to follow the movement of the field of view or of the world being displayed, causing an impaired sense of realism or a visually induced motion sickness.

In addition, in a case where the head-mounted display is used as the display device, it is desirable that a system for rendering images is separated from the head-mounted display, and that data transfer therebetween is performed in a wireless manner, from the standpoint of ease of movement of the user. However, as higher quality of the image world is sought after, the amount of data to be transferred increases, and the risk of a delay in display or a failure in transmission increases depending on a communication environment. Moreover, if communication and processing loads cause an increased power consumption, the head-mounted display may increase in weight or generate heat due to an internal battery or the like, which may lead to reduced comfort of wearing.

The present invention has been conceived in view of such problems, and an object thereof is to provide a technique for enabling high-quality images to be displayed with low delay. Another object of the present invention is to provide a technique for improving the comfort of wearing a head-mounted display.

Solution to Problems

To solve the above problems, a mode of the present invention relates to an image display system. This image display system is an image display system including an image generation device that generates data of a display image, and a head-mounted display that receives and displays the data of the display image. The image generation device includes a reduction processing section that converts the display image to transmission data in which different regions of an image plane have different reduction ratios, while the head-mounted display includes an image size restoration section that restores the transmission data to the display image in an original size.

Another mode of the present invention relates to an image display method. This image display method includes, by an image generation device, a step of generating data of a display image, a step of converting the display image to transmission data in which different regions of an image plane have different reduction ratios, and a step of transmitting the transmission data to a head-mounted display, and, by the head-mounted display, a step of restoring the transmission data to the display image in an original size, and displaying the display image.

Note that any combinations of constituent elements described above, and a method, a device, a system, a computer program, a data structure, a recording medium, and so on which have features of the present invention, are also effective as modes of the present invention.

Advantageous Effects of Invention

The present invention is able to combine responsivity and quality of image display. In addition, improved comfort of wearing a head-mounted display can thereby be achieved.

DESCRIPTION OF EMBODIMENT

Figure 1:
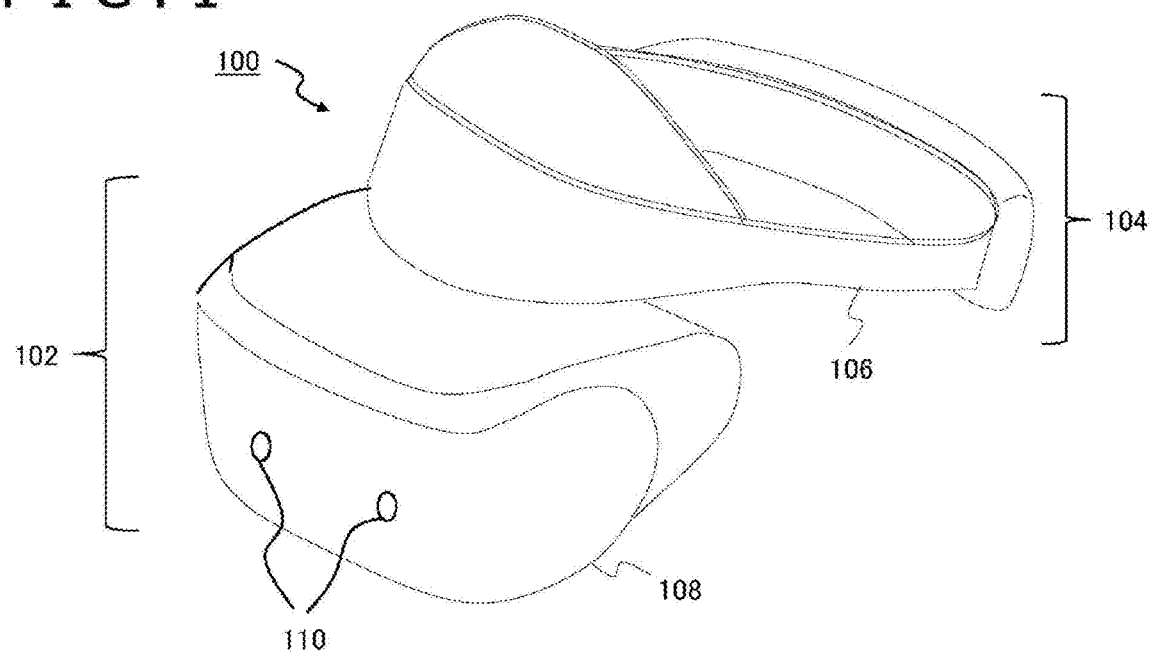
FIG. 1 is a diagram illustrating an example external appearance of a head-mounted display according to the present embodiment.

The present embodiment relates to an image display system of a type that causes a display device to instantaneously display streaming moving image data transferred from an external entity. As long as this is satisfied, the type of the display device is not limited to particular types, but a head-mounted display will herein be described as an example. FIG. 1 illustrates an example external appearance of a head-mounted display 100. In this example, the head-mounted display 100 includes an output mechanism unit 102 and a wearing mechanism unit 104. The wearing mechanism unit 104 includes a wearing band 106 to be worn by a user so as to extend around a head to achieve fixing of the device.

The output mechanism unit 102 includes a housing 108 so shaped as to cover left and right eyes of the user when the head-mounted display 100 is worn by the user, and includes an internal display panel arranged to be opposite to the eyes when the head-mounted display 100 is worn by the user. Inside of the housing 108, an eyepiece is additionally provided which is positioned between the display panel and the eyes of the user when the head-mounted display 100 is worn by the user to expand the viewing angle of the user. In addition, the head-mounted display 100 may further include a loudspeaker or an earphone at a position that will correspond to the position of an ear of the user when the head-mounted display 100 is worn by the user. Moreover, the head-mounted display 100 contains a motion sensor to detect a translational movement and/or rotational movement of the head of the user wearing the head-mounted display 100, and hence the position and/or posture thereof at a given time.

In this example, the head-mounted display 100 has a stereo camera 110 provided on a front of the housing 108, and a moving image of a surrounding real space is captured therewith with a field of view corresponding to a line of sight of the user. When the image captured is displayed instantaneously, what is called a video see-through experience, in which the user can see a real space that the user faces as it is, can be accomplished. Further, when a virtual object is rendered upon an image of a real object appearing in the image captured, augmented reality can be accomplished.

Figure 2:
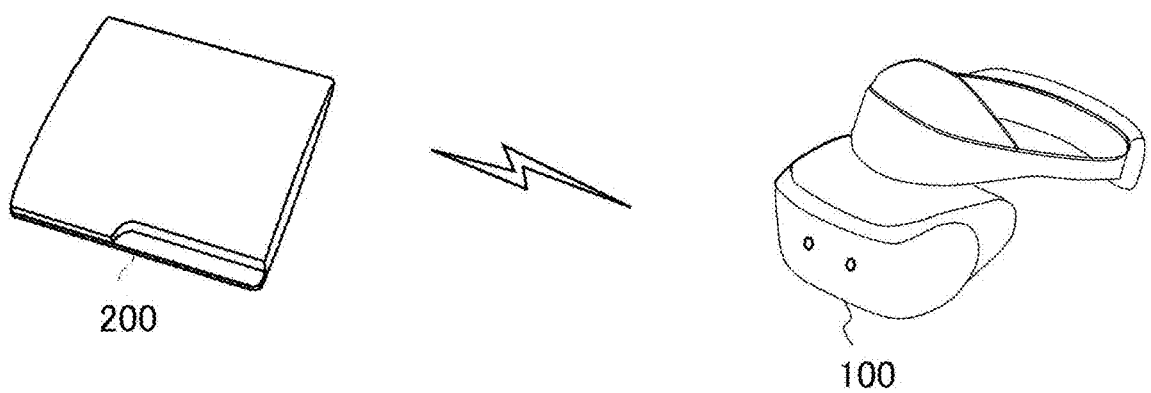
FIG. 2 is a diagram illustrating an example configuration of an image display system according to the present embodiment.

FIG. 2 illustrates an example configuration of the image display system according to the present embodiment. The head-mounted display 100 is connected to an image generation device 200 via wireless communication or an interface for connection of a peripheral device compliant with USB (Universal Serial Bus) or the like. The image generation device 200 may be further connected to a server via a network. In this case, the server may provide an online application, such as a game in which a plurality of users can participate through the network, to the image generation device 200.

The image generation device 200 identifies the position of a viewpoint and the direction of the line of sight on the basis of the position and posture of the head of the user wearing the head-mounted display 100, generates a display image with a field of view that matches the identified position of the viewpoint and the identified direction of the line of sight, and outputs the generated display image to the head-mounted display 100. As long as this is satisfied, the purpose of displaying the image may vary. For example, the image generation device 200 may generate display images of a virtual world that is a scene of a computerized game while allowing the game to progress, or may display a still image or a moving image, either of a virtual world or of a real world, for viewing or providing information. When a panoramic image is displayed with a wide angle of view with the viewpoint of the user in the center, a sense of immersion into the world being displayed can be provided.

Figure 3:
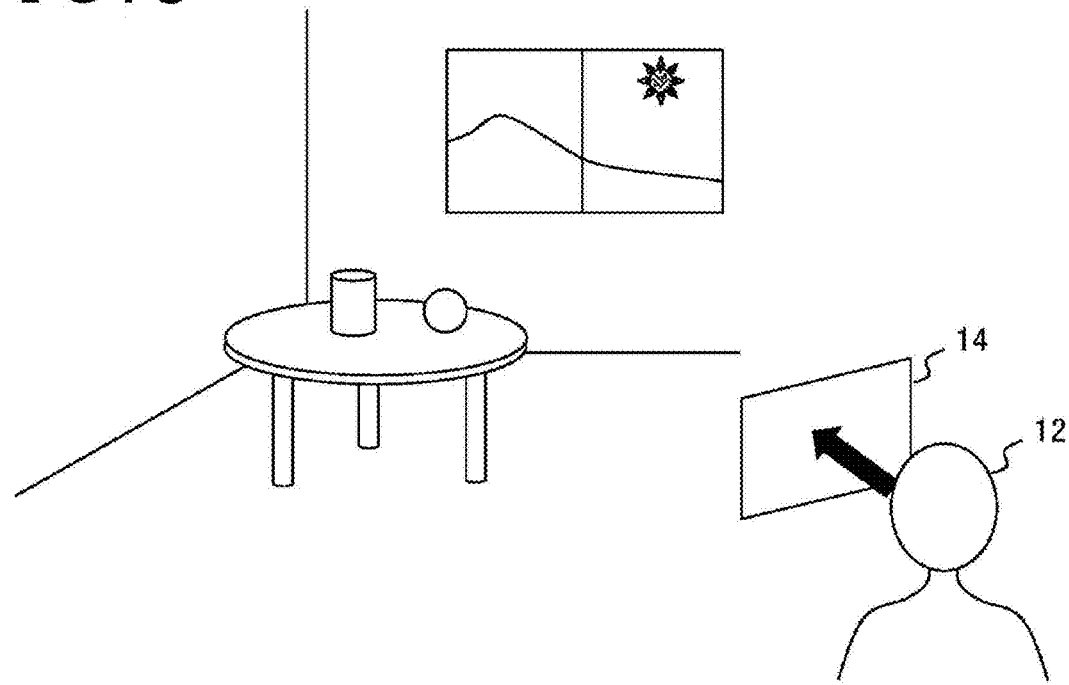
FIG. 3 is a diagram for explaining an example of an image world that an image generation device according to the present embodiment causes the head-mounted display to display.

FIG. 3 is a diagram for explaining an example of an image world that the image generation device 200 causes the head-mounted display 100 to display in the present embodiment. In this example, a situation in which a user 12 is in a room that is a virtual space is created. In a world coordinate system that defines the virtual space, objects of a wall, a floor, windows, a table, items on the table, and so on are arranged as illustrated in the figure. The image generation device 200 defines a view screen 14 that matches the position of a viewpoint of the user 12 and the direction of the line of sight thereof in the world coordinate system, and represents images of the objects thereon to render a display image.

When the position of the viewpoint of the user 12 and the direction of the line of sight thereof (hereinafter, sometimes referred to comprehensively as the "viewpoint") are acquired at a predetermined rate, and the position and orientation of the view screen 14 are changed accordingly, images can be displayed with the field of view corresponding to the viewpoint of the user. When stereo images involving a parallax are generated, and are displayed in left and right regions of the display panel, three-dimensional representation of the virtual space can be accomplished. The user 12 can thus experience virtual reality, feeling as if he or she were in the room in the world being displayed.

Figure 4:
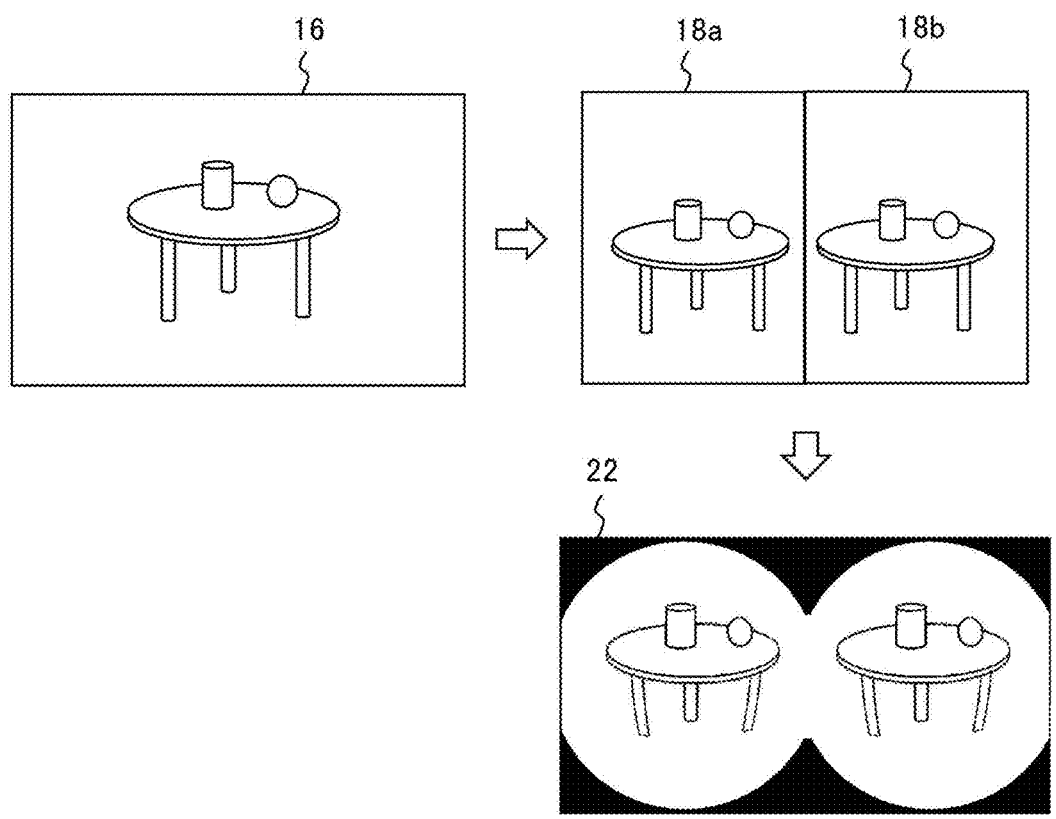
FIG. 4 illustrates an example of a procedure in which an image to be displayed by the head-mounted display is generated in the present embodiment.

FIG. 4 illustrates an example of a procedure in which an image to be displayed by the head-mounted display is generated in the form illustrated in FIG. 3. First, the objects existing in the virtual world are projected onto the view screen corresponding to the viewpoint of the user, whereby an image 16 that matches the field of view of the user is generated. This process is, in fact, a process in which coordinates of vertices of each object in the world coordinate system that defines the virtual world are transformed to coordinates in a coordinate system of the view screen, and then, texture is mapped onto a surface forming the object. This image essentially represents an image that the user should view.

When the three-dimensional representation is to be provided, figures in the image 16 are shifted in the lateral direction by a distance of the parallax corresponding to the distance between the left and right eyes, or the image 16 is generated for each eye, whereby stereo images including an image 18a for the left eye and an image 18b for the right eye are generated. Then, each of the images is subjected to inverse correction in accordance with distortion by the eyepiece, whereby a final display image 22 is generated. Here, the inverse correction is a process of distorting the image in directions opposite to those of the distortion by the lens in advance so that the original image 16 can be visually recognized when seen through the eyepiece. For example, in the case of a lens that causes four sides of the image to appear to be recessed in the form of a pincushion, the image is bent in the form of a barrel as illustrated in the figure.

Basically, the image generation device 200 periodically acquires information related to the head-mounted display 100, and, by extension, information related to the position and posture of the head of the user, and then generates display images with the corresponding field of view, and transmits the generated display images sequentially to the head-mounted display 100. The head-mounted display 100 outputs the received images sequentially to the display panel, but it can happen that the field of view of the received images does not match the actual viewpoint at the time of display, due to the rendering time of the images, the transfer time of the data, or the like.

As a countermeasure, the head-mounted display 100 may have a function of reprojection of correcting the field of view of the image so as to match the actual viewpoint immediately before the image is displayed. In a case where the reprojection is to be accomplished, the image generation device 200 generates and transmits an image with a margin region for the reprojection added to the field of view assumed from the acquired position and posture of the head of the user. Thus, the head-mounted display 100 causes an image having a range that matches the viewpoint at a time immediately before display to be displayed through appropriate cutting out (see, for example, Japanese Patent Laid-open No. 2017-215875).

Here, when a wide margin region is set, an image that matches the viewpoint at the time of display can be displayed without a loss even when the head of the user moves quickly. In addition, in a system in which an image is seen through the eyepiece as in the head-mounted display 100, it is desirable that the image is generated with a high resolution with the rate of magnification taken into account with respect to a region magnified by the lens. To maintain video quality in various situations, the need to transmit a great amount of data from the image generation device 200 to the head-mounted display 100 arises, which can interfere with reducing delay, wireless communication, and so on.

Accordingly, the image generation device 200 according to the present embodiment transmits display images with a partial region that is unlikely to be viewed in detail because of human visual characteristics and characteristics of the eyepiece reduced in a frame of each display image, thereby achieving a reduction in data size. For example, the image generation device 200 reduces the image for the left eye and the image for the right eye represented in the left and right regions in the display image 22 of FIG. 4 with respect to regions that are distant from the centers thereof by a predetermined value or more.

The head-mounted display 100 magnifies the reduced regions to display the image having the original size restored. In this case, the reduced regions will have a reduced resolution, but this state is unlikely to be recognized considering that the human ability to discriminate information is reduced with increasing distance from a point of gaze due to the visual characteristics of humans in general. In addition, in the image to which distortion that matches the eyepiece has been added, a peripheral region originally has a reduced resolution, which limits an effect on visual recognition.

Therefore, such an appropriate selection of regions to be reduced can reduce the size of data to be transmitted while maintaining the quality recognized by the user. In addition, data of a region outside of the field of view of the user, i.e., a region filled with black in the display image 22, may be excluded from the data to be transmitted to achieve a further reduction in data size. The regions to be reduced, the reduction ratios thereof, or the distribution thereof may be changed even within one moving image depending on the situation.

For example, during a period in which the point of gaze is not stable because of, for example, a movement of the head of the user, a period in which an object to be displayed moves so greatly as to cause an image thereof to be visually recognized in a blurred form, or the like, enlarging a region to be reduced or increasing the degree of reduction would not be easily noticed. In addition, during a period in which the communication condition is poor, a loss of a part of the display image, a blackout, or other such situations can be avoided by enlarging a region to be reduced and/or increasing the degree of reduction to reduce the data size. Such control of the data size suited to the occasion enables detailed images to be continuously displayed with respect to any region that is important for recognition by the user.

Figure 5:
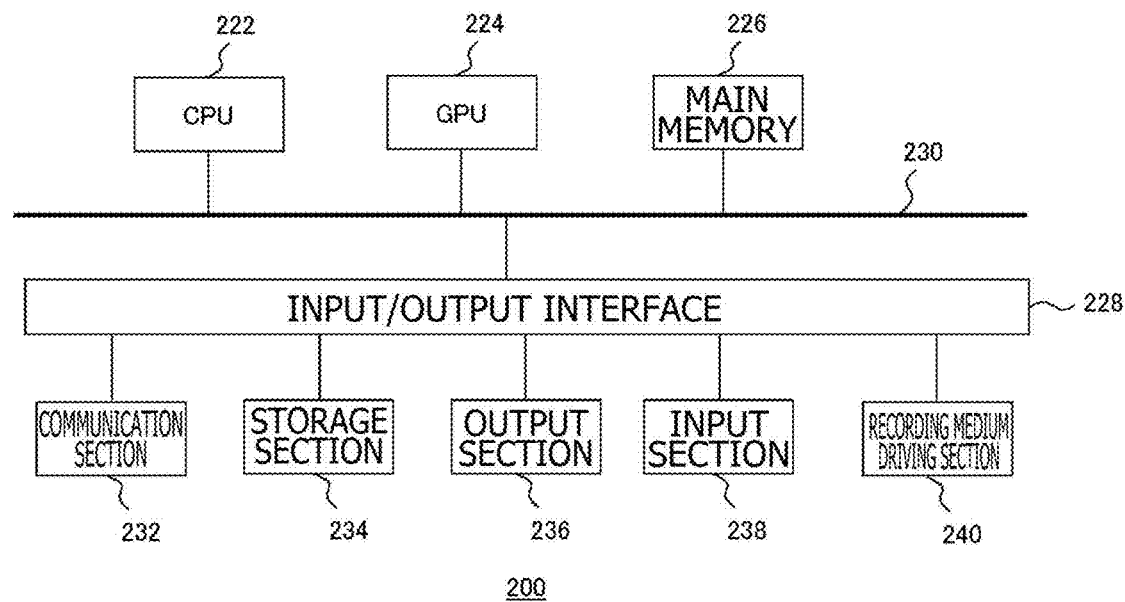
FIG. 5 is a diagram illustrating the internal circuit configuration of the image generation device according to the present embodiment.

FIG. 5 illustrates the internal circuit configuration of the image generation device 200. The image generation device 200 includes a CPU (Central Processing Unit) 222, a GPU (Graphics Processing Unit) 224, and a main memory 226. These components are connected to one another via a bus 230. Further, an input/output interface 228 is connected to the bus 230.

Connected to the input/output interface 228 are a communication section 232, which is formed by a peripheral device interface, such as a USB or an IEEE (Institute of Electrical and Electronics Engineers) 1394 interface, or a wired or wireless LAN (Local Area Network) network interface, a storage section 234 such as a hard disk drive or a non-volatile memory, an output section 236 that outputs data to the head-mounted display 100, an input section 238 that accepts input of data from the head-mounted display 100, and a recording medium driving section 240 that drives a removable recording medium, such as a magnetic disk, an optical disk, or a semiconductor memory.

The CPU 222 controls the whole of the image generation device 200 by executing an operating system stored in the storage section 234. The CPU 222 also executes various types of programs, which may be read from the removable recording medium and loaded into the main memory 226, or be downloaded via the communication section 232. The GPU 224 has a function of a geometry engine and a function of a rendering processor, performs a rendering process in accordance with a rendering instruction from the CPU 222, and outputs a result to the output section 236. The main memory 226 is formed by a RAM (Random Access Memory), and stores data and a program required for processing.

Figure 6:
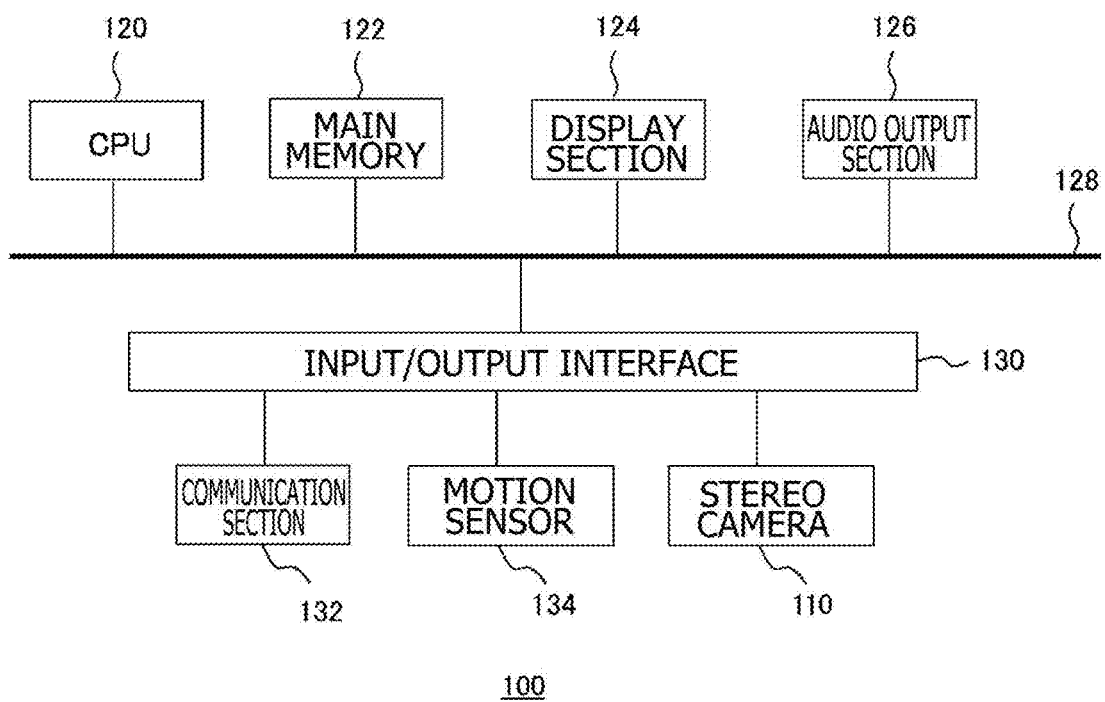
FIG. 6 is a diagram illustrating the internal circuit configuration of the head-mounted display according to the present embodiment.

FIG. 6 illustrates the internal circuit configuration of the head-mounted display 100. The head-mounted display 100 includes a CPU 120, a main memory 122, a display section 124, and an audio output section 126. These components are connected to one another via a bus 128. Further, an input/output interface 130 is connected to the bus 128. A communication section 132 which is formed by a wired or wireless LAN network interface, a motion sensor 134, and the stereo camera 110 are connected to the input/output interface 130.

The CPU 120 processes information acquired from various portions of the head-mounted display 100 via the bus 128, and supplies data of the display images and audio acquired from the image generation device 200 to the display section 124 and the audio output section 126. The main memory 122 stores data and a program required for processing in the CPU 120.

The display section 124, which is formed by a display panel, such as a liquid crystal panel or an organic EL (Electroluminescent) panel, displays images in front of the eyes of the user wearing the head-mounted display 100. Three-dimensional representation may be accomplished by displaying a pair of parallax images in regions corresponding to the left and right eyes as described above. The display section 124 further includes a pair of lenses that are positioned between the display panel and the eyes of the user wearing the head-mounted display 100 to expand the viewing angle of the user.

The audio output section 126 is formed by a loudspeaker or an earphone provided at a position that will correspond to the position of the ear of the user when the head-mounted display 100 is worn by the user, and causes the user to hear audio. The communication section 132 is an interface for transmitting and receiving data to or from the image generation device 200, and accomplishes communication by a known wireless communication technology, such as Bluetooth (registered trademark). The motion sensor 134 includes a gyro sensor and an acceleration sensor, and acquires the angular velocity and acceleration of the head-mounted display 100.

As illustrated in FIG. 1, the stereo camera 110 includes a pair of video cameras that capture a surrounding real space from left and right viewpoints with the field of view corresponding to the viewpoint of the user. Values measured by the motion sensor 134 and data of images captured by the stereo camera 110 are transmitted to the image generation device 200 via the communication section 132 as necessary.

Figure 7:
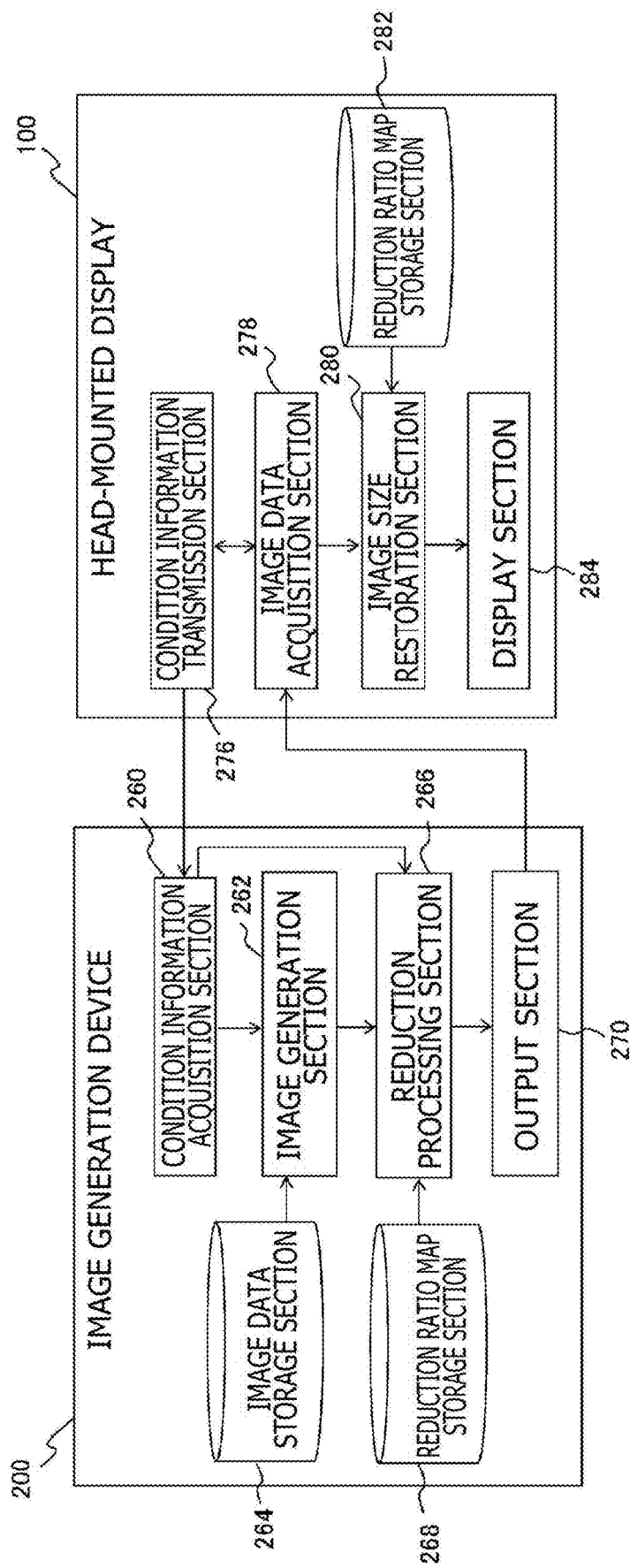
FIG. 7 is a diagram illustrating the configuration of functional blocks of the image generation device and the head-mounted display according to the present embodiment.

FIG. 7 illustrates the configuration of functional blocks of the image generation device 200 and the head-mounted display 100 according to the present embodiment. The image generation device 200 may perform common information processing for causing a computerized game to progress and/or communicating with a server as described above, but in FIG. 7, a focus is placed on, in particular, functions for generating and transmitting the display images. Note that at least some of the functions of the image generation device 200 illustrated in FIG. 7 may be implemented on the server connected to the image generation device 200 via the network.

In addition, the functional blocks illustrated in FIG. 7 can be implemented in hardware by the CPUs, the GPU, the various memories, and so on illustrated in FIGS. 5 and 6, and can be implemented in software by a program that is loaded from a recording medium or the like into the memory and which exercises various functions, such as a data input function, a data retention function, an image processing function, a communication function, and a display function. Therefore, it will be understood by those skilled in the art that these functional blocks can be implemented in various forms in hardware alone, in software alone, or in a combination of hardware and software, and the functional blocks may be implemented in any of such forms.

The image generation device 200 includes a condition information acquisition section 260 that acquires information related to real-time conditions of the head-mounted display 100 and communication, an image generation section 262 that generates the display images, an image data storage section 264 that stores data used to generate the images, a reduction processing section 266 that reduces the generated images as necessary, a reduction ratio map storage section 268 that stores a map representing a distribution of reduction ratios, and an output section 270 that outputs data of the generated images to the head-mounted display 100.

The condition information acquisition section 260, which is formed by the input section 238, the CPU 222, and so on illustrated in FIG. 5, acquires information related to the position and posture of the head of the user, which is transmitted from the head-mounted display 100, at a predetermined rate. Alternatively, the condition information acquisition section 260 may acquire, from the head-mounted display 100, data of the values measured by the motion sensor 134, the images captured by the stereo camera 110, etc., at a predetermined rate, and calculate the position and posture of the head of the user on its own on the basis of at least one piece of such data. A known technique, such as V-SLAM (Visual Simultaneous Localization and Mapping), can be used as a method for acquiring the position and posture from the captured images.

The condition information acquisition section 260 may also acquire the condition of the communication with the head-mounted display 100 at a predetermined rate. Here, the condition of the communication refers to a communication bandwidth, a communication delay, or the like realized at the time. For example, the condition information acquisition section 260 acquires a delay time from transmission of image data to arrival thereof at the head-mounted display 100 on the basis of a response signal from the head-mounted display 100.

Alternatively, the condition information acquisition section 260 may acquire, from the head-mounted display 100, the percentage of image data that has arrived at the head-mounted display 100 out of all transmitted image data as a data arrival rate. The condition information acquisition section 260 can acquire the amount of data that has been successfully transmitted in a unit time, i.e., an available bandwidth, on the basis of such information.

The image generation section 262, which is formed by the CPU 222, the GPU 224, and so on illustrated in FIG. 5, generates the display images at a predetermined rate according to, for example, the procedure illustrated in FIG. 4. Specifically, the image generation section 262 sets the view screen corresponding to the viewpoint on the basis of the information of the position and posture of the head of the user, and projects an object existing in a three-dimensional virtual space onto the view screen, thereby generating images for the left eye and the right eye. Then, the image generation section 262 adds distortion that matches the eyepiece of the head-mounted display 100 to each of the images, and places the resulting image in left and right regions of an image plane, thereby generating an image like the display image 22 in FIG. 4. In a case where the abovementioned reprojection is to be accomplished, the image generation section 262 generates the image with a margin region added thereto.

The image data storage section 264, which is formed by the main memory 226 and so on illustrated in FIG. 5, stores model data of the objects to be displayed, data related to features of the virtual space, and information related to the distortion that matches the eyepiece of the head-mounted display 100. Note that the display images generated by the image generation device 200 are not limited to three-dimensional objects, but may be panoramic images or the like captured separately, real-time images being captured by the stereo camera 110 of the head-mounted display 100, images obtained by subjecting these images to processing, or the like.

Alternatively, the image generation device 200 may acquire images of various types of contents, such as cloud gaming and a movie, transmitted from a server (not illustrated) via the network, and instantaneously decode and decompress the images. The reduction processing section 266, which is formed by the CPU 222, the GPU 224, and so on illustrated in FIG. 5, reduces the display images (i.e., frames) generated by the image generation section 262 using different reduction ratios for different regions in the image plane. In addition, the reduction processing section 266 excludes data of a region outside of the field of view of the eyepiece from data to be transmitted.

The reduction ratio map storage section 268, which is formed by the main memory 226 and so on illustrated in FIG. 5, stores setting data of one or a plurality of reduction ratio maps each representing a distribution of reduction ratios over the image plane. The reduction ratio map may be in the form of a lookup table representing position coordinates of pixels in the image plane associated with reduction ratios. The reduction processing section 266 reduces data of a sequence of images supplied from the image generation section 262 sequentially using the reduction ratios set in the reduction ratio map. At this time, the reduction processing section 266 may acquire, from the condition information acquisition section 260, at least one of the condition of the communication with the head-mounted display 100 and information related to the movement of the head of the user, and switch the reduction ratio map to be referred to on the basis of the acquired condition and/or information.

For example, in a situation in which it can be determined that it is not necessary to reduce the data size, such as when the communication band is equal to or wider than a threshold value, the reduction processing section 266 refers to a reduction ratio map that has the smallest area of a region to be reduced or which has the smallest degree of reduction set by the reduction ratio. In addition, also in a situation in which it is necessary to limit the reduction in image quality, such as when the angular velocity of the head of the user is equal to or lower than a threshold value, the reduction processing section 266 refers to the reduction ratio map that has the smallest area of the region to be reduced or which has the smallest degree of reduction. Note that the reduction processing section 266 may not perform a reduction process in such situations.

Then, as the communication band reduces or the angular velocity of the head increases, the reduction processing section 266 switches the referent to a reduction ratio map that has a larger area of the region to be reduced or which has a larger degree of reduction. Accordingly, in the reduction ratio map storage section 268, a range of communication bands and a range of angular velocities of the head are stored so as to be associated with each reduction ratio map to be adopted. Note that parameters on the basis of which the reduction ratio map to be referred to is switched are not limited to the communication band and the angular velocity of the head.

Specifically, the parameters may be any parameters that are capable of deriving the degree of the "necessity to reduce the data size" or the degree of the "necessity to limit the reduction in image quality," and may be a communication delay time, the velocity or acceleration of the head, the velocity or acceleration of the point of gaze of the user with respect to the display image, the velocity of an object with respect to the viewpoint, the magnitude of optical flow, and so on. Any of these parameters may be used singly, or two or more of these parameters may be used in combination.

For example, the reduction processing section 266 uses these parameters to obtain scores, in a numerical form, of the degree of the "necessity to reduce the data size" and the degree of the "necessity to limit the reduction in image quality." The "necessity to reduce the data size" and the "necessity to limit the reduction in image quality" are in a trade-off relation, and therefore, the reduction ratio map to be referred to is uniquely determined on the basis of balance between the two scores.

The output section 270, which is formed by the CPU 222, the main memory 226, the output section 236, and so on illustrated in FIG. 6, sequentially sends data of the display images subjected to the reduction by the reduction processing section 266 as necessary to the head-mounted display 100. Note that the output section 270 may compression-encode the data using a coding scheme, such as H.264/MPEG-4 AVC (Moving Picture Experts Group-4 Advanced Video Coding) or H.265/MPEG-H HEVC (Moving Picture Experts Group-H High Efficiency Video Coding), and then transmit the resulting data to the head-mounted display 100 in a streaming manner.

The head-mounted display 100 includes a condition information transmission section 276 that transmits information related to real-time conditions of the head-mounted display 100, an image data acquisition section 278 that acquires the data of the images transmitted from the image generation device 200, an image size restoration section 280 that restores the acquired data to the display images in an original size, a reduction ratio map storage section 282 that stores a reduction ratio map used for the restoration, and a display section 284 that displays the images in the original size restored.

The condition information transmission section 276, which is formed by the CPU 120, the motion sensor 134, the stereo camera 110, the communication section 132, and so on illustrated in FIG. 6, transmits the information related to the position and posture of the head of the user, or data of captured images or measured values for deriving such information, to the image generation device 200 at a predetermined rate. In addition, in a case where the reduction ratio or the distribution thereof is adjusted in accordance with the movement of the point of gaze, the condition information transmission section 276 transmits information related to the position coordinates of the point of gaze measured by a point-of-gaze detector, which is not illustrated, to the image generation device 200.

The condition information transmission section 276 may also transmit data for deriving the condition of the communication with the image generation device 200, i.e., a response signal or information such as the percentage of data received by the image data acquisition section 278, to the image generation device 200 when necessary. The image data acquisition section 278, which is formed by the CPU 120, the communication section 132, the main memory 122, and so on illustrated in FIG. 6, acquires the data of the display images transmitted from the image generation device 200. In a case where the data has been compression-encoded, the data is decoded and decompressed sequentially.

The image size restoration section 280, which is formed by the CPU 120, the main memory 122, and so on illustrated in FIG. 6, restores the data transmitted from the image generation device 200 to the display images in the original size on a frame by frame basis. Specifically, out of the acquired data, images of any reduced regions are magnified and joined together to restore the display images in the original size. The reduction ratio map storage section 282, which is formed by the main memory 122 and so on illustrated in FIG. 6, stores data of the reduction ratio map to be referred to when the image size restoration section 280 restores the image size.

The image size restoration section 280 refers to the same reduction ratio map that has been used by the reduction processing section 266 of the image generation device 200, and restores the original size by performing magnification with the reciprocal of the reduction ratio set therein. Accordingly, identification information common to the image generation device 200 and the head-mounted display 100 is assigned to each reduction ratio map in advance. The image generation device 200 embeds the identification information of the reduction ratio map used for the reduction process in, for example, a header of the image data to enable the head-mounted display 100 to identify the appropriate reduction ratio map.

In a case where the reduction ratio map is switched in the midst of display, the image generation device 200 may transmit the identification information of the reduction ratio map to the head-mounted display 100 each time the reduction ratio map is switched. Note that means for identifying the reduction ratio map is not limited to transmission and reception of the identification information. For example, ranges of the parameters indicating various conditions may be associated with the reduction ratio maps in the head-mounted display 100 as well so that the reduction ratio map to be referred to can be identified with actual values transmitted from the image generation device 200 or acquired by the image size restoration section 280 on its own.

The display section 284, which is formed by the CPU 120, the main memory 122, the display section 124, and so on illustrated in FIG. 6, drives the display panel to cause the images restored by the image size restoration section 280 and loaded into the memory to be displayed. Note that, in a case where the reprojection is to be accomplished, the display section 284 acquires the current position and posture of the head of the user, corrects the image on the basis thereof, and outputs the corrected image to the display panel.

Figure 8:
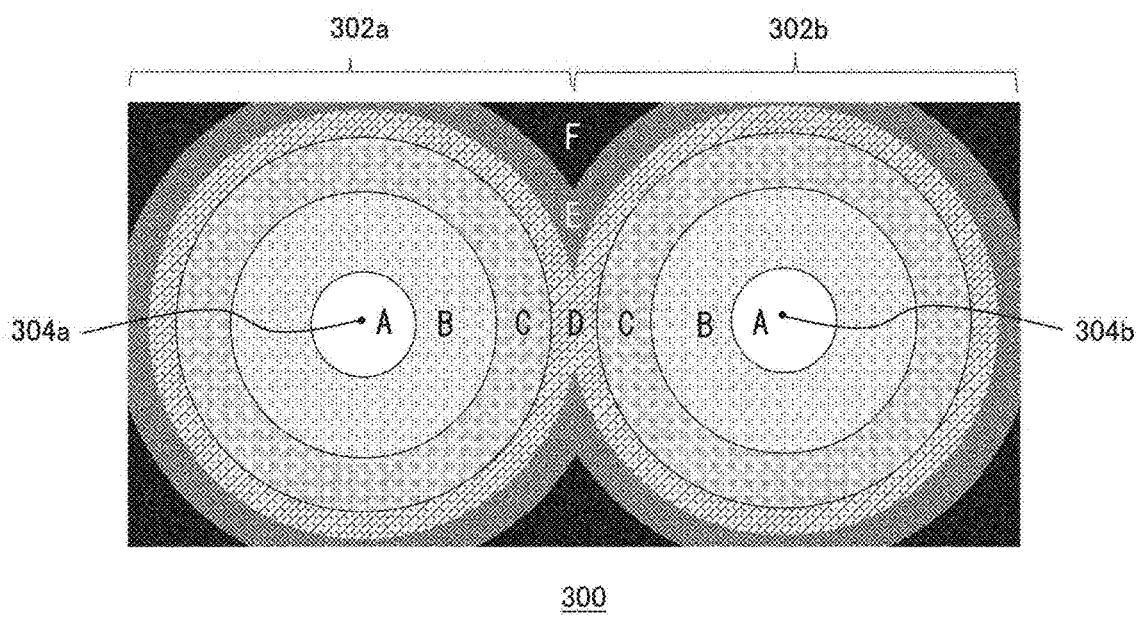
FIG. 8 is a diagram schematically illustrating a reduction ratio map set in the present embodiment.

FIG. 8 schematically illustrates one of the reduction ratio maps set in the present embodiment. As described above, a reduction ratio map 300 may be, for example, in the form of a lookup table representing position coordinates on the image plane associated with reduction ratios, but, in this figure, is depicted as a distribution of the reduction ratios over the image plane. In this example, an image plane including a region 302a for the left eye and a region 302b for the right eye like that of the display image 22 illustrated in FIG. 4 is assumed. Then, the regions are divided by concentric circles centered on image centers 304a and 304b, which correspond to centers of the left and right lenses, respectively, to define units for which the reduction ratios are set.

More specifically, the regions are divided into circular regions A including the image centers 304a and 304b, hollow circular regions B outside thereof, hollow circular regions C outside thereof, and so on. Regions D and E outside of the regions C are joined at a boundary between the region 302a for the left eye and the region 302b for the right eye as illustrated in the figure. In addition, a region F including sides of the image plane is a region in which pixel values are invalid because the region F is outside of the field of view. In the reduction ratio map, a reduction ratio is associated with pixels forming each of the divided regions A to F.

For example, reduction ratios (area ratios) of 1, 1/4, 1/16, and so on are set for the pixels forming the regions A, B, C, and so on, respectively. Thus, the degree of reduction can be set to be greater as the range of distances from the image center 304a or 304b is greater in each of the region 302a for the left eye and the region 302b for the right eye. In addition, a setting to the effect that invalid data should not be transmitted is associated with the outermost region F.

Here, the width of each of the regions B to E may be equal to the radius of the region A, or may alternatively be determined independently as illustrated in the figure. For example, the width and/or reduction ratio of each region may be optimized in accordance with the amount of change in image height caused by refraction of the eyepiece. In addition, in a case where a plurality of reduction ratio maps is set, the reduction ratio set for each region may be arranged to be different with the divided regions as illustrated in the figure remaining the same, or the number, size, and/or shape of the regions may be arranged to be different.

Figure 9:
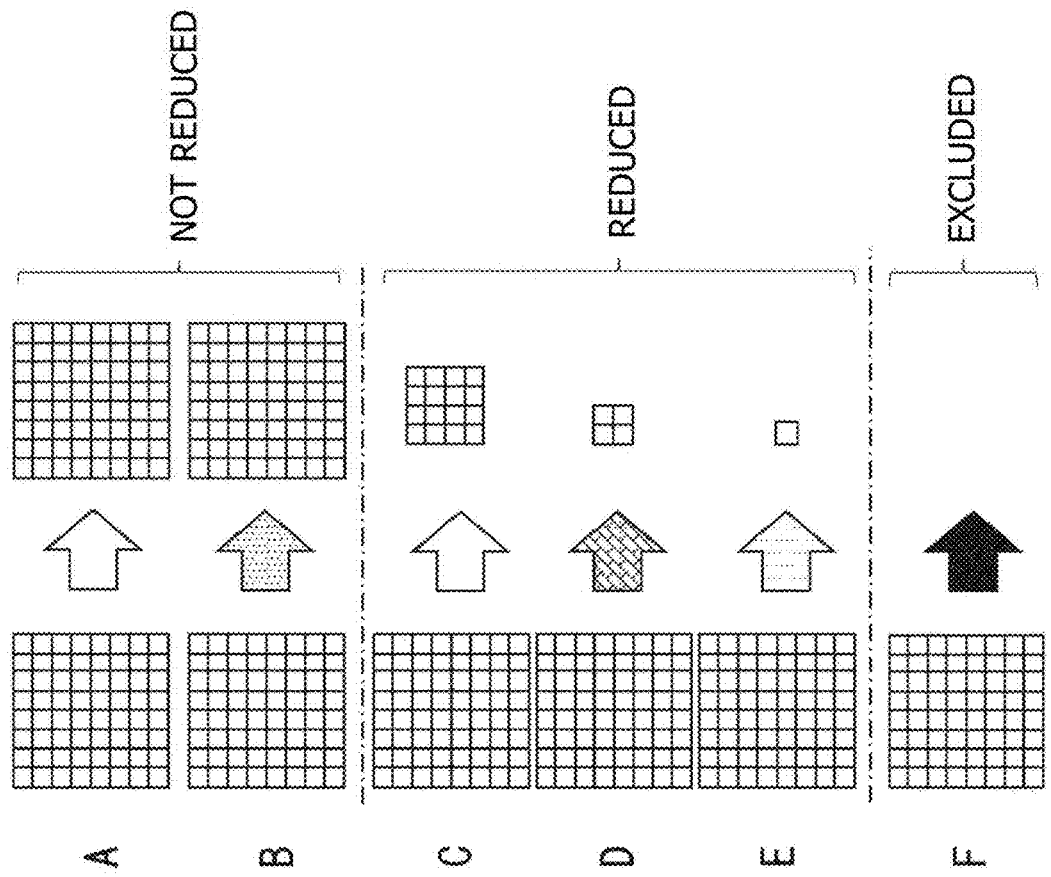
FIG. 9 is a diagram for explaining a process performed by a reduction processing section of the image generation device to reduce an image with reference to the reduction ratio map in the present embodiment.
Figure 9:
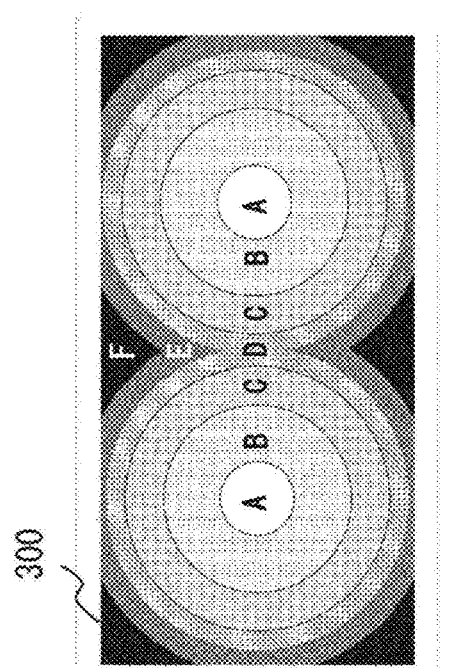

FIG. 9 is a diagram for explaining a process performed by the reduction processing section 266 of the image generation device 200 to reduce an image with reference to the reduction ratio map. The reduction ratio map to be used is illustrated on the left side of the figure, and in this example, use of the reduction ratio map 300 including the regions A to F illustrated in FIG. 8 is assumed. The right-side portion of the figure illustrates how the reduction processing section 266 reduces the image in accordance with settings of the regions, and the smallest rectangles each represent one pixel region. The reduction processing section 266 first divides the display image into pixel blocks of the same size, and reduces the image in units of pixel blocks. In the illustrated example, each pixel block includes 8×8 pixels.

In this example, the image is not reduced, i.e., is reduced by a reduction ratio of 1, with respect to pixel blocks included in each of the regions A and B, with the result that each of these pixel blocks still includes 8×8 pixels. Pixel blocks included in the regions C are reduced by a ratio of 1/2 both vertically and horizontally, with the result that each of these pixel blocks includes 4×4 pixels. Pixel blocks included in the regions D are reduced by a ratio of 1/4 both vertically and horizontally, with the result that each of these pixel blocks includes 2×2 pixels. Pixel blocks included in the regions E are reduced by a ratio of 1/8 both vertically and horizontally, with the result that each of these pixel blocks includes 1×1 pixel. Any of known methods, such as a bilinear method, a nearest neighbor method, and a bicubic method, may be employed for the reduction.

In addition, pixel blocks included in the region F are excluded from the data to be transmitted. The reduction processing section 266 refers to the reduction ratio map to determine whether the pixel blocks in each of the regions are to be left untouched or to be reduced, and identify the set value of the reduction ratio when the pixel blocks are to be reduced. When a condition such as the condition of the communication or the movement of the head has changed, the reduction processing section 266 switches the reduction ratio map to be referred to, and changes the regions to be reduced and/or the reduction ratios.

For example, when the condition of the communication has deteriorated, the reduction processing section 266 may also reduce the pixel blocks included in the regions B by a ratio of 1/4. When the movement of the head has stopped, the reduction processing section 266 may exclude the pixel blocks included in the regions C from the data to be reduced. It will be understood by those skilled in the art that the reduction ratios of the respective regions can be adjusted in various manners to achieve a target data size.

Figure 10:
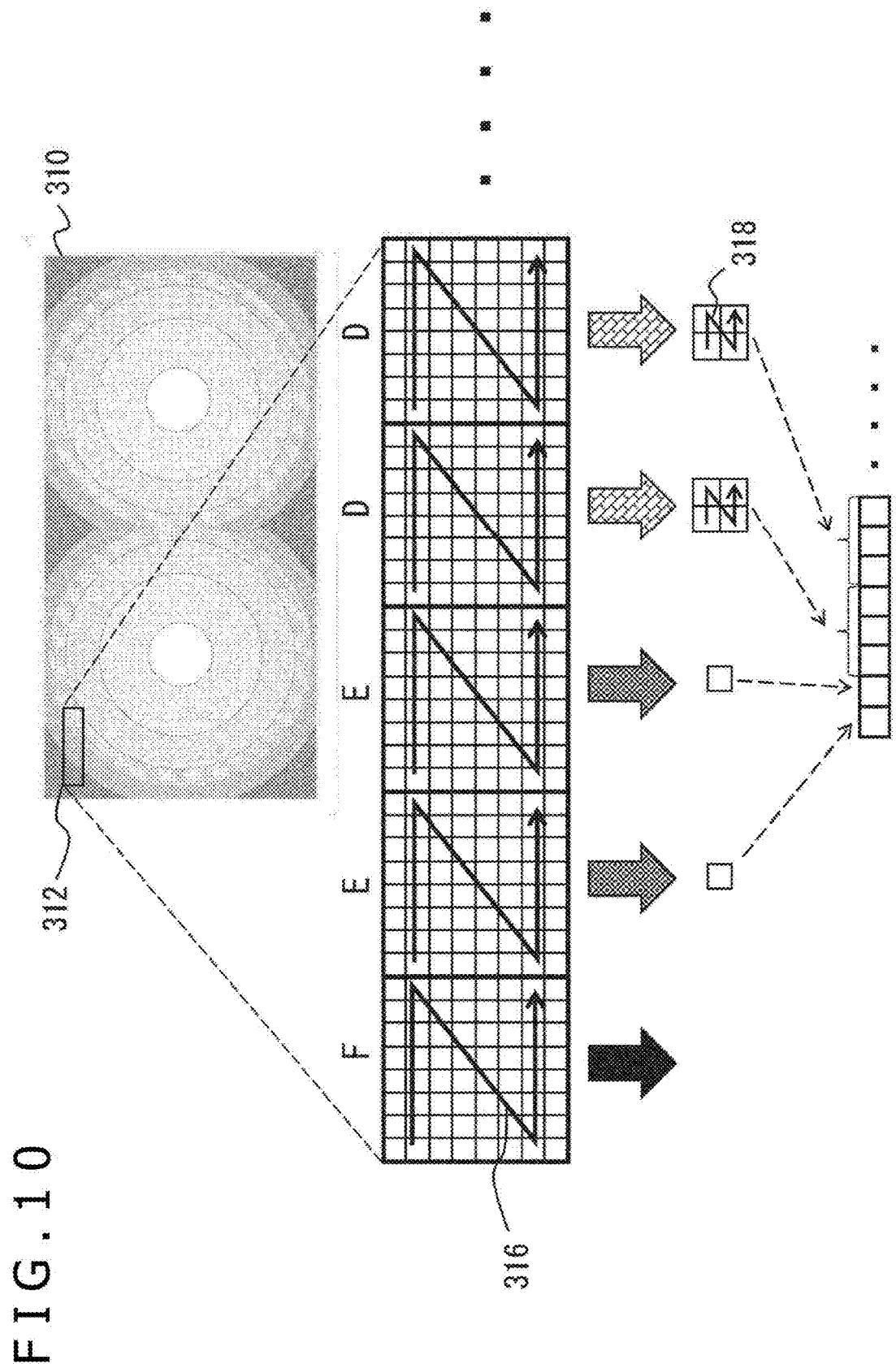
FIG. 10 is a diagram for explaining a sequence of pieces of image data outputted from the reduction processing section in the present embodiment.

FIG. 10 is a diagram for explaining a sequence of pieces of image data outputted from the reduction processing section 266. In a case where each pixel block is assumed to include 8×8 pixels as illustrated in FIG. 9, the reduction processing section 266 causes the reduction process to progress from a left end to the right in each of eight pixel lines. For example, with respect to five pixel blocks in a region 312, which are illustrated in enlarged form in the middle of the figure, the leftmost pixel block is included in the region F, and is therefore excluded from the data to be transmitted. Each of the second and third pixel blocks from the left is included in the region E, and is therefore reduced in size to one pixel according to the settings of FIG. 9.

Each of the fourth and fifth pixel blocks is included in the region D, and is therefore reduced in size to 2×2 pixels according to the settings of FIG. 9. In more detail, the reduction processing section 266 scans the pixels in a raster order in units of pixel blocks as indicated by an arrow (e.g., an arrow 316) in each pixel block, and excludes data or makes data an input value of reduction computation sequentially. As a result, the data is supplied from the reduction processing section 266 to the output section 270 in the raster order in units of pixel blocks. Note, however, that data of the region F is not supplied.

In the illustrated example, as illustrated at the bottom of the figure, data of one pixel of the second pixel block, data of one pixel of the third pixel block, data of four pixels of the fourth pixel block, data of four pixels of the fifth pixel block, and so on are outputted in this order. Note that, in a case where a result of the reduction includes a plurality of pixels, e.g., 2×2 pixels, pieces of data are outputted in the raster order, the data of an upper left pixel first followed by the data of the other pixels, in units of blocks as indicated by an arrow (e.g., an arrow 318) in the block representing the result of the reduction.

Similarly, in the case of a block that is not reduced, e.g., a block in the region A, pixel values are outputted in the raster order within the block of 8×8=64 pixels. Note that, in this case, the output section 270 may output all frames as intra frames according to a coding scheme, such as H.265/MPEG-H HEVC.

Figure 11:
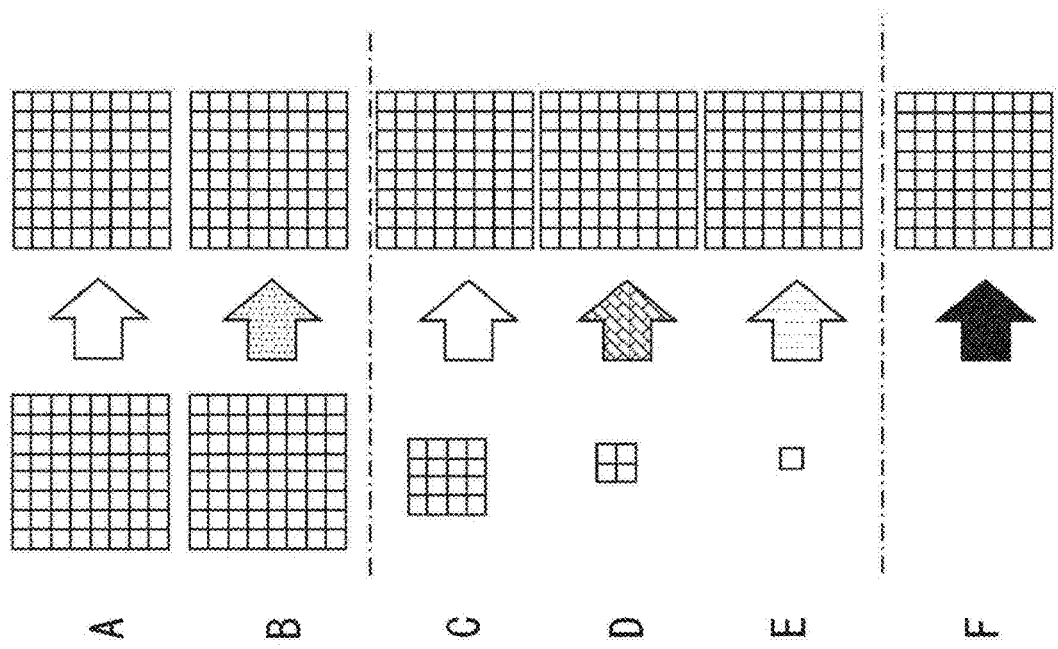
FIG. 11 is a diagram for explaining a process performed by an image size restoration section of the head-mounted display to restore the image size with reference to the reduction ratio map in the present embodiment.
Figure 11:
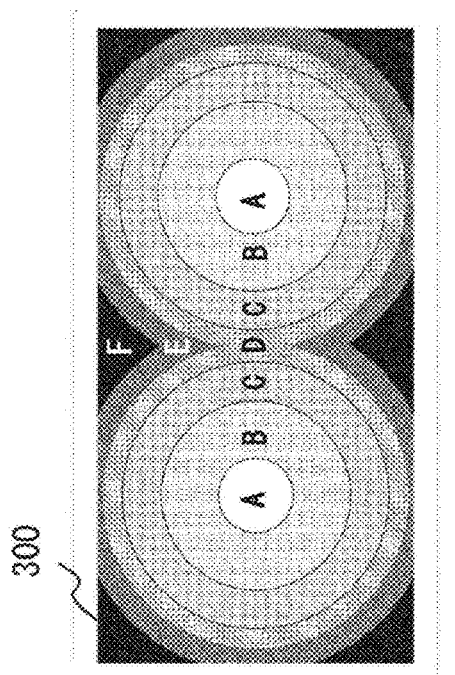

FIG. 11 is a diagram for explaining a process performed by the image size restoration section 280 of the head-mounted display 100 to restore the image size with reference to the reduction ratio map. The reduction ratio map to be used is illustrated on the left side of the figure, and also in this example, use of the reduction ratio map 300 including the divided regions A to F illustrated in FIG. 8 is assumed. This reduction ratio map 300 is assumed to be identical to the reduction ratio map used by the image generation device 200 for the reduction process. The right-side portion of the figure illustrates how the image size restoration section 280 restores the original size of the image in accordance with the settings of the regions.

The image size restoration section 280 refers to the reduction ratio map identified on the basis of, for example, the identification information of the reduction ratio map transmitted from the image generation device 200, and separates a sequence of transmitted pixels into pixel blocks. At this stage, the pixel blocks vary in size, and therefore, the image size restoration section 280 magnifies the pixel blocks when appropriate. In the illustrated example, each of pixel blocks included in the regions A and B, which includes 8×8 pixels, is not magnified. With respect to the pixels included in the region C, sixteen pixels are developed to 4×4 pixels, and are magnified twice both vertically and horizontally to obtain 8×8 pixels.

With respect to the pixels included in the region D, four pixels are developed to 2×2 pixels, and are magnified four times both vertically and horizontally to obtain 8×8 pixels. With respect to the pixels included in the region E, each pixel is magnified eight times both vertically and horizontally to obtain 8×8 pixels. Any of known methods, such as a bilinear method, a nearest neighbor method, and a bicubic method, may be employed for the magnification. In addition, because data of the pixels included in the region F is not transmitted, data of 8×8 pixels each having an invalid pixel value is prepared in advance. Then, the image size restoration section 280 joins adjacent pixel blocks sequentially to form the display image.

Figure 12:
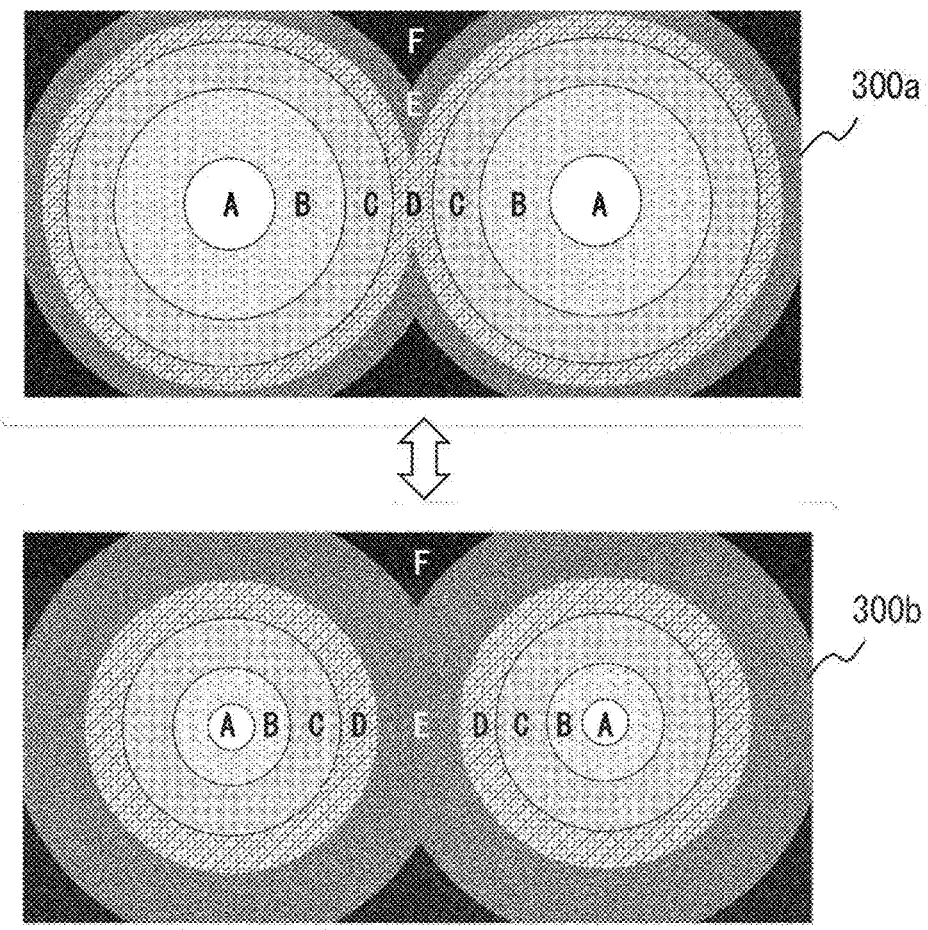
FIG. 12 is a diagram illustrating examples of reduction ratio maps that are switched by the image generation device in accordance with conditions in the present embodiment.

FIG. 12 illustrates examples of reduction ratio maps that are switched by the image generation device 200 in accordance with the conditions. As described above, the reduction processing section 266 may switch the reduction ratio map to be referred to on the basis of the information of various real-time conditions acquired by the condition information acquisition section 260. In the figure, a reduction ratio map 300a is identical to the reduction ratio map 300 illustrated in FIG. 8 and so on. Meanwhile, in a reduction ratio map 300b, the region E, which has a large degree of reduction, has a greater area, and the region A, which is not reduced, has a smaller area than in the reduction ratio map 300a.

Therefore, qualitatively, the reduction ratio map 300a is used when the degree of the "necessity to limit the reduction in image quality" is large, while the reduction ratio map 300b is used when the degree of the "necessity to reduce the data size" is large. For example, the reduction processing section 266 uses the reduction ratio map 300a to perform the reduction process in normal conditions. Then, when it is detected that the available communication bandwidth has become equal to or less than a threshold value, the referent is switched to the reduction ratio map 300b. When the available communication bandwidth has thereafter exceeded a threshold value, the reduction processing section 266 switches the referent back to the reduction ratio map 300a.

Note that the threshold value of the bandwidth for switching the referent to the reduction ratio map 300b may be either equal to or different from the threshold value of the bandwidth for switching the referent back to the reduction ratio map 300a. Making these threshold values different from each other can prevent switching of the reduction ratio map from occurring more frequently than is necessary. The parameters on the basis of which the reduction ratio map is switched are not limited to the communication band, but may be any of various parameters, such as the velocity of the head, the velocity of the point of gaze, and the velocity of an object, as described above. A plurality of such parameters may be used in combination.

In addition, the timing of the switching is not limited to a time when the parameter has exceeded the threshold value, but may alternatively be, for example, a time when a scene being represented is switched. Further, although the figure illustrates an example in which switching is made between two reduction ratio maps, switching may be made between three or more reduction ratio maps on the basis of transitions between three or more states. Alternatively, with one reduction ratio map prepared, switching may be made between performing reduction using the one reduction ratio map and not reducing any part of the image.

Figure 13:
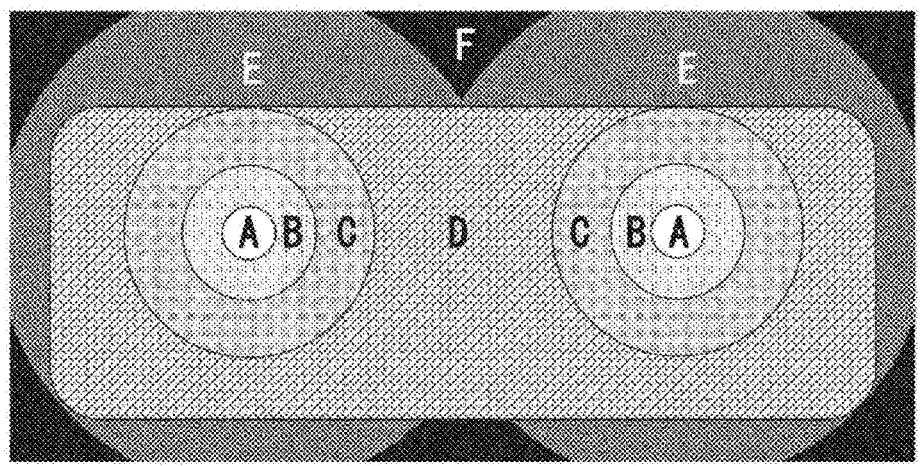
FIG. 13 illustrates other examples of reduction ratio maps that can be used in the present embodiment.
Figure 13:
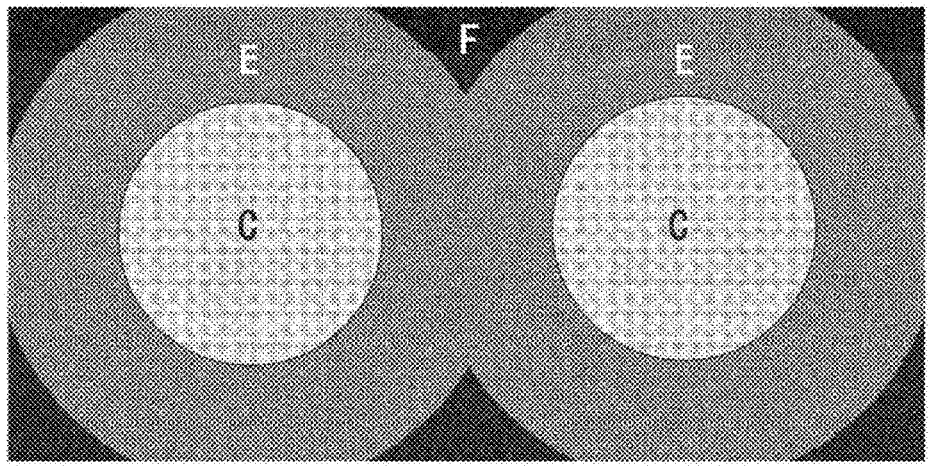

FIG. 13 illustrates other examples of reduction ratio maps that can be used in the present embodiment. It is assumed that the same reduction ratios as in the reduction ratio map 300 described above by way of example are set for characters A to F of regions in the figure. First, in part (a), a region D is not in the shape of a hollow circle, but is a region that is substantially quadrilateral (in the shape of a rounded rectangle) and which extends over regions for the left eye and the right eye. Moreover, a center of the region D is placed on a lower side of a center of the image plane, which increases the percentage of an area lying in a lower half thereof, thereby increasing the area of upper portions of regions E, which have a large degree of reduction.

Human vision has the property of being more sensitive to an object in a lower part of the field of view than to an object in an upper part of the field of view. Accordingly, instead of reducing the upper and lower parts symmetrically, the average degree of reduction in a lower-half region is arranged to be smaller than that in an upper-half region to make it less likely for a reduction in image quality to be recognized even when the data size remains the same. In the figure, the upper and lower regions of the image plane are arranged to be asymmetrical, but alternatively, in each of the regions for the left eye and the right eye, left and right parts may be arranged to be asymmetrical, or upper and lower parts and the left and right parts may both be arranged to be asymmetrical. For example, the degree of reduction may be made smaller in a region toward which a face is turned or the point of gaze is moved.

In addition, the shape of the regions is not limited, and may be a circle, a hollow circle, a rectangle, a rounded rectangle, an ellipse, a hollow ellipse, a polygon, or the like, and two or more of such shapes may be used in combination. Part (b) illustrates a reduction ratio map that includes only three types of regions C, E, and F and in which the region A, which is not to be reduced, is not set. For example, when the angular velocity of the head of the user is equal to or higher than the threshold value, the object to be displayed is visually recognized in a blurred form. Thus, the reduction ratio map as illustrated in the figure is used to make the degree of reduction relatively large even in the vicinity of the center of the image, thereby significantly reducing the data size while limiting an effect on recognition. While, as suggested above, the number of regions in which reduction ratios are set is not limited, it is desirable that relatively small degrees of reduction are set in the vicinity of the centers of the images for the left eye and the right eye.

In the mode described above, the degree of reduction is basically arranged to be greater with increasing distance from the centers of the images for the left eye and the right eye. This makes it possible to reduce the data size while limiting an effect on image quality in recognition by the user, due to the human visual characteristics and characteristics of image viewing through the lenses. Meanwhile, in a case where the image is divided into blocks and is compression-encoded and transmitted in units of the blocks, the units can be utilized in the reduction process to increase efficiency of the process.

Figure 14:
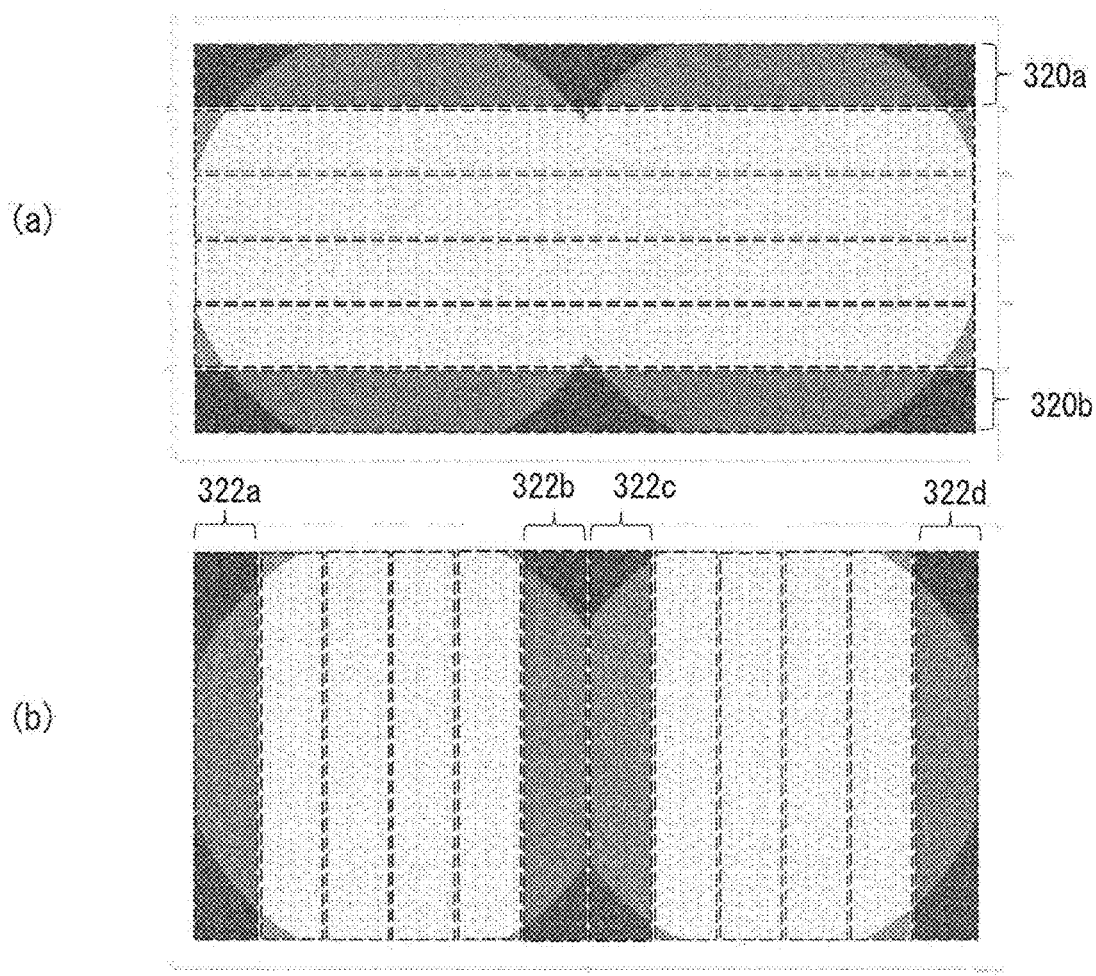
FIG. 14 is a diagram for explaining a mode in which the unit on the basis of which the reduction ratio is controlled matches a coding scheme for the image data in the present embodiment.

FIG. 14 is a diagram for explaining a mode in which the unit on the basis of which the reduction ratio is controlled matches the coding scheme for the image data. In the case of H.265/MPEG-H HEVC, which is a video compression standard, an image of one frame is divided into slices and tiles having predetermined sizes, and is compression-encoded in units thereof. Thus, when the reduction process in the present embodiment is performed in units of slices or tiles, a series of processes, including reduction, compression-encoding, transfer, decoding/decompression, and magnification, can be performed in the same units.

This eliminates a time of waiting for data, a time required to change the order of data, and so on caused by a difference in processing unit, and contributes to accomplishing display with lower delay. Part (a) of the figure represents a reduction ratio map that assumes a case where compression-encoding is performed in units of slices, which are obtained by dividing the image plane into six equal parts extending horizontally. In this example, a top slice 320a and a bottom slice 320b represented in gray are to be reduced. An appropriate reduction ratio is set for each of the slices to be reduced.

Part (b) represents a reduction ratio map that assumes a case where compression-encoding is performed in units of slices, which are obtained by dividing the image plane into twelve equal parts extending vertically. In this example, a left-end slice 322a and a right-end slice 322b of the image for the left eye and a left-end slice 322c and a right-end slice 322d of the image for the right eye represented in gray are to be reduced. Thus, the images are reduced in the regions apart from the centers of the image for the left eye and the image for the right eye with the division rule of the coding scheme followed, whereby the data size can be reduced with a limited effect on recognition, and a further reduction in delay can be achieved.

In the figure, the slices are classified into two types, those to be reduced and those not to be reduced, but as in FIG. 8, a plurality of reduction ratios may be assigned to the slices such that the degree of reduction is greater with increasing distance from the image centers. In addition, also in this mode, the reduction ratios assigned may be changed in accordance with information of real-time conditions. That is, in a situation in which there is a desire to reduce the data size, the degree of reduction as a whole may be increased, or the number of slices to be reduced may be increased.

In addition, also in this case, as described above with reference to part (a) of FIG. 13, the reduction may be performed with an asymmetrical distribution of the reduction ratio with respect to the upper and lower parts of the image plane, or with respect to the left and right parts in each of the image regions for the left eye and the right eye. Further, the reduction ratio may be controlled in units of tiles, for example, which are obtained by dividing the slice into parts.

According to the present embodiment described above, the image generation device transmits data in which one display image has different reduction ratios in different regions, and the display image is displayed in the display device with the original size thereof restored. At this time, the reduction ratios are set with a distribution allowing for the human visual characteristics. In addition, in a case where a head-mounted display of a type that provides viewing through an eyepiece is used, for example, the distribution of the reduction ratio is set with distortion caused by the lens taken into account, and data outside of the field of view is excluded from the data to be transmitted. The size of the transmission data can thus be reduced with a limited effect on recognition, and costs required for processing and communication can be reduced to accomplish secure display with low delay.

In addition, eliminating information that is unnecessary for recognition makes it possible to increase the amount of information of a region that is magnified by the lens and of a region that can easily be viewed in detail by the user. Further, reducing the data size makes it easier to increase the frame rate. As a result, high-quality images can be provided to the user for viewing without much difficulty. In addition, changing the setting of the distribution of the reduction ratio makes it possible to perform data transmission and image display in an optimum condition that matches the situation.

In addition, in a case where the head-mounted display is used, reduced weight, reduced heat generation, and so on can also be accomplished, resulting in improved comfort of wearing, because wireless communication is made easier, and the internal structure of the head-mounted display can be made simpler. Further, in a case where a system for delivering moving images through a server and a network, such as cloud gaming, is implemented, an experience of enjoying high-quality video with low delay can easily be realized by reducing data to be delivered in a similar manner.

The present invention has been described above with reference to an embodiment thereof. It should be understood by those skilled in the art that the above embodiment have been described by way of example only, and that various modifications are possible with respect to combinations of constituent elements and processes thereof, and such modifications also fall within the scope of the present invention.

INDUSTRIAL APPLICABILITY

As will be apparent from the foregoing description, the present invention is applicable, for example, to various types of information processing devices, such as an image display system, an image generation device, a head-mounted display, a game device, and an image display device, and to an image processing system including any of these information processing devices.

REFERENCE SIGNS LIST

100: Head-mounted display
110: Stereo camera
120: CPU
122: Main memory
124: Display section
132: Communication section
134: Motion sensor
200: Image generation device
222: CPU
224: GPU
226: Main memory
260: Condition information acquisition section
262: Image generation section
264: Image data storage section
266: Reduction processing section
268: Reduction ratio map storage section
270: Output section
276: Condition information transmission section
278: Image data acquisition section
280: Image size restoration section
282: Reduction ratio map storage section
284: Display section

The invention claimed is:

1. An image generation device comprising:
a memory storing computer readable instructions; and
one or more processors that, upon execution of the computer readable instructions, cause the image generation device to perform operations comprising:
generating a reduced display image by reducing a display image using a reduction ratio map representing a distribution of reduction ratios over an image plane, wherein reducing the display image reduces a number of pixels of the display image to result in the reduced display image;
compression-encoding data of the reduced display image; and
transmitting information related to the reduction ratio map and the reduced display image to a head-mounted display.

2. The image generation device according to claim 1, wherein
the display image is reduced in units of pixel blocks each having a predetermined size, and
an original size of the display image is restored by magnifying reduced pixel blocks and joining the pixel blocks together.

3. The image generation device according to claim 1, further comprising:
generating the display image by generating an image for a left eye and an image for a right eye, adding thereto distortion that matches an eyepiece of the head-mounted display, and then placing a resulting image in left and right regions, wherein
the reduction ratios are changed on a basis of a range of distances from a center of each of the image for the left eye and the image for the right eye.

4. The image generation device according to claim 3, wherein a region of the display image outside of a field of view of the eyepiece is excluded from transmission.

5. The image generation device according to claim 1, further comprising:
acquiring at least one of a condition of communication with the head-mounted display and information regarding a predetermined condition in the head-mounted display, wherein
changing setting of the reduction ratios in the image plane on a basis of the information acquired.

6. The image generation device according to claim 1, wherein
the head-mounted display is configured to restore the original size of the display image with reference to the used reduction ratio map.

7. The image generation device according to claim 1, wherein an average degree of reduction in a lower-half region of the image plane is allowed to be smaller than that in an upper-half region of the image plane.

8. The image generation device according to claim 1, wherein
the display image is compression-encoded in units of divided blocks, and
the reduction ratios are allowed to be different in units of the blocks.

9. A method comprising:
generating a reduced display image by reducing a display image using a reduction ratio map representing a distribution of reduction ratios over an image plane, wherein reducing the display image reduces a number of pixels of the display image to result in the reduced display image;
compression-encoding data of the reduced display image; and
transmitting information related to the reduction ratio map and the reduced display image to a head-mounted display.

10. A non-transitory, computer-readable storage medium containing a computer program, which when executed by a computer, causes the computer to perform actions comprising:
generating a reduced image by reducing a display image using a reduction ratio map representing a distribution of reduction ratios over an image plane, wherein reducing the display image reduce a number of pixels of the display image to result in the reduced display image;
compression-encoding data of the reduced display image; and
transmitting information related to the used reduction ratio map and the reduced display image to a head-mounted display.

11. The method of claim 9, further comprising
restoring the display image in an original size with reference to the used reduction ratio map.

12. The method of claim 11, wherein
said reducing the display image is performed in units of pixel blocks each having a predetermined size, wherein the method further comprises:
magnifying reduced pixel blocks; and
joining the pixel blocks together.

13. The method of claim 12, wherein said generating the data of the display image comprises:
generating an image for a left eye and an image for a right eye;
adding distortion that matches an eyepiece of the head-mounted display to the image for the left eye and the image for the right eye;
changing the reduction ratios on a basis of a range of distances from a center of each of the image for the left eye and the image for the right eye; and
placing the images added distortion in respective left and right regions.

14. The method of claim 12, further comprising:
excluding a region of the display image outside of a field of view of the eyepiece from transmission.

15. The method of claim 9, further comprising:
acquiring at least one of a condition of communication with the head-mounted display and information regarding a predetermined condition in the head-mounted display; and
changing setting of the reduction ratios in the image plane on a basis of the information acquired.

16. The non-transitory, computer-readable storage medium of claim 10, wherein the actions further comprises:
restoring the display image in an original size with reference to the used reduction ratio map.

17. The non-transitory, computer-readable storage medium of claim 16, wherein
said reducing the display image is performed in units of pixel blocks each having a predetermined size, wherein the actions further comprises:
magnifying reduced pixel blocks; and
joining the pixel blocks together.

18. The non-transitory, computer-readable storage medium of claim 17, wherein said generating the data of the display image comprises:
generating an image for a left eye and an image for a right eye;
adding distortion that matches an eyepiece of the head-mounted display to the image for the left eye and the image for the right eye;
changing the reduction ratios on a basis of a range of distances from a center of each of the image for the left eye and the image for the right eye; and
placing the images added distortion in respective left and right regions.

19. The non-transitory, computer-readable storage medium of claim 17, wherein the actions further comprise:
excluding a region of the display image outside of a field of view of the eyepiece from transmission.

20. The non-transitory, computer-readable storage medium of claim 10, wherein the actions further comprise:
acquiring at least one of a condition of communication with the head-mounted display and information regarding a predetermined condition in the head-mounted display; and
changing setting of the reduction ratios in the image plane on a basis of the information acquired.

* * * * *